United States Patent [19]

Nishimura

[11] Patent Number: 4,674,358

[45] Date of Patent: Jun. 23, 1987

[54] MANUAL WITH AUXILIARY TRANSMISSION

[75] Inventor: Sadanori Nishimura, Saitama, Japan

[73] Assignee: Honda Giken Kogyo Kabushiki Kaisha, Tokyo, Japan

[21] Appl. No.: 908,961

[22] Filed: Sep. 18, 1986

Related U.S. Application Data

[63] Continuation of Ser. No. 636,028, Jul. 30, 1984, abandoned.

[30] Foreign Application Priority Data

Aug. 1, 1983 [JP] Japan ............................ 58-139379
Sep. 20, 1983 [JP] Japan ......................... 59-145381[U]

[51] Int. Cl.⁴ .................................................. F16H 3/10
[52] U.S. Cl. ....................................... 74/745; 74/360; 74/363; 74/368; 74/369
[58] Field of Search ............... 74/745, 360, 362, 363, 74/368, 369, 366, 740, 330

[56] References Cited

U.S. PATENT DOCUMENTS

| | | | |
|---|---|---|---|
| 2,596,367 | 5/1952 | Browne | 74/368 |
| 2,975,656 | 3/1961 | Haverlender | 74/745 |
| 4,252,031 | 2/1981 | Nishimura et al. | 74/360 |
| 4,261,217 | 4/1981 | Arai et al. | 74/360 |
| 4,368,650 | 1/1982 | Numazawa et al. | 74/740 |
| 4,416,168 | 11/1983 | Arai et al. | 74/740 |
| 4,466,502 | 8/1984 | Sakai | 180/247 |

FOREIGN PATENT DOCUMENTS

| | | | |
|---|---|---|---|
| 25823 | 4/1987 | European Pat. Off. | 74/740 |
| 2049170 | 4/1972 | Fed. Rep. of Germany | 74/745 |
| 57-69141 | 4/1982 | Japan | 74/745 |
| 1003911 | 9/1965 | United Kingdom . | |
| 1241744 | 8/1971 | United Kingdom . | |
| 2021712 | 12/1979 | United Kingdom . | |
| 2063395 | 6/1981 | United Kingdom . | |

OTHER PUBLICATIONS

German Journal Article, by Karl Theodor Renius, pp. 97 thru 106, 1968.

Primary Examiner—Rodney H. Bonck
Assistant Examiner—Dwight G. Diehl
Attorney, Agent, or Firm—Lyon & Lyon

[57] ABSTRACT

A vehicular transmission in which a multiple speed manual transmission of the two parallel shaft type has an auxiliary transmission connected in series between the two shafts for some of the multiple speeds. The auxiliary transmission providing a high speed and a low speed. The auxiliary transmission includes gearing for providing the high or low speeds to the gears on one of the shafts. A hydraulic clutch and a one-way clutch in said auxiliary transmission selectively connect the high or low speed gearing, with the one-way clutch engaging when the hydraulic clutch is disengaged and being overrun when the hydraulic clutch is engaged.

8 Claims, 7 Drawing Figures

MANUAL WITH AUXILIARY TRANSMISSION

This appplication is a continuation of application Ser. No. 636,028, filed July 30, 1984, now abandoned.

The present invention relates to a vehicular transmission in which a manual transmission is connected through a transmission clutch to an engine and, in particular, to an arrangement wherein an auxiliary transmission with high and low speeds is included.

A transmission of this kind has been known in the prior art in which an auxiliary transmission equipped with two high and low speed transmission lines are connected in series to a manual transmission. In such case, said auxiliary transmission is generally constructed of the type, in which the high speed transmission line or the low speed transmission line is selectively established by the action of a change-over clutch of synchromesh or another type in which individual clutches are attached to the respective transmission lines so that when each hydraulic clutch is applied the corresponding transmission line may be established. However, the auxiliary transmission of the former type has its operability deteriorated because the transmission clutch has to be released each time the auxiliary transmission is shifted. On the other hand, the auxiliary transmisssion of the latter type is followed by disadvantage that the transmission has its size enlarged and its cost raised because it requires two hydraulic clutches. Typical prior art transmisssions are shown in U.S. Pat. Nos. 2,975,656 and 3,354,745.

The present invention has an object to eliminate the disadvantages described above and to provide a small, light and inexpensive vehicular transmission which is able to change the speeds of an auxiliary transmission without releasing a transmission clucth. According to the present invention, there is provided a vehicular transmission of the type, in which a manual transmission is connected through a transmission clutch to an engine and in which said manual transmission is connected in series to an auxiliary transmission having high and low speed transmission lines, said vehicluar transmission being characterized in that said auxiliary transmisssion has its high speed transmisssion line equipped with a hydraulic clutch and its low speed transmission line equipped with a one-way clutch for allowing the overrun of the output side so that said low speed transmission line may be established when said hydraulic clutch is released whereas high speed transmission line may be established when said hydraulic clutch is applied.

A further object of this invention is to provide a vehicular transmission of this type in which a manual transmission has two parallel shafts so that the auxiliary transmission may be assembled therein as compactly as possible. Specificallly, the invention is characterized in that there is borne on either input shaft or the output shaft of a manual transmission a sleeve shaft which is connected through a transmission gear mechanism to the other shaft, and in that said one shaft is extended backward to have its extension arranged in the recited order or the backward direction with a coacting gear, which is fixed on said sleeve shaft, said hydraulic clutch and a fixed gear which is fixed on said one shaft, and in that there is arranged on the extension of said other shaft outside of said hydraulic clutch an idle gear mechanism for providing connection between said coacting gear and said fixed gear; and in that said low speed transmission line is constructed by incorporating said one-way clutch into said idle gear mechanism whereas said high speed transmission line is constructed by enabling said sleeve shaft to be connected to or disconnected from said one shaft through said hydraulic clutch. A still further object of this invention is to provide such a transmission wherein the hydraulic pump for the hydraulic clutch is provided at the end of the transmission input shaft and driven by a shaft inside the hollow input shaft.

The present invention will be described in the following in connection with the preferred embodiments thereof with reference to the accompanying drawings, wherein.

Figure 1:
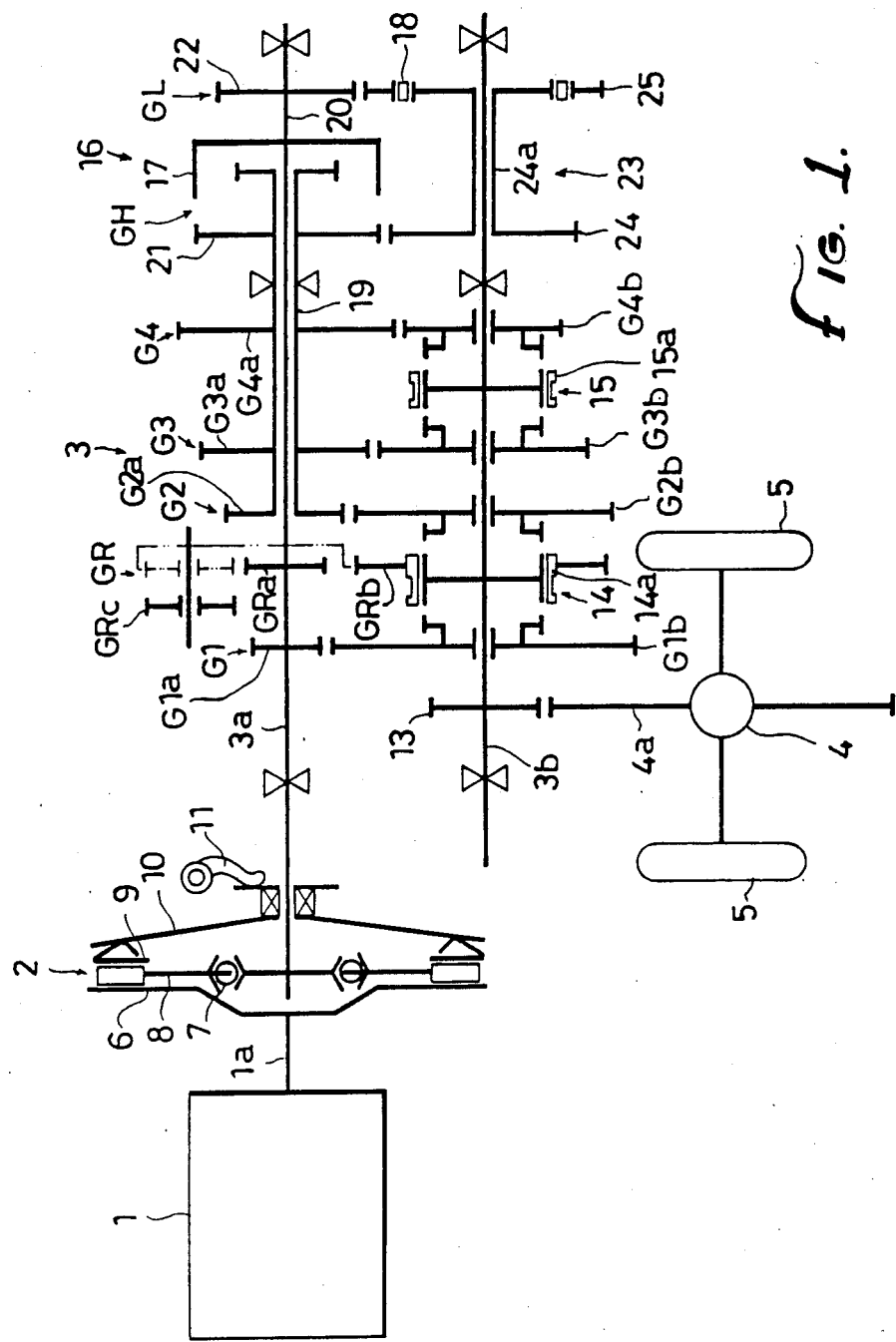
FIG. 1 is a diagramatic view of a first embodiment of the transmission of this invention.

Referring first to FIG. 1, numerals 1 and 2 indicate an engine and a transmission clutch, respectively. Indicated at numeral 3 is a primary transmission shown as a manual transmission which is connected to said engine 1 through said transmission clutch 2. All of the members recited in the above constitute together a vehicular transmission such that the output of said manual transmission 3 is transmitted through a differential gear 4 to vehicular drive wheels 5.

The transmission clutch 2 is equipped with a clutch wheel 6, which is connected to the crankshaft 1a of the engine 1, and a disc 8 which is connected through a damper 7 to the input shaft 3a of the manual transmission 3. The transmission clutch 2 is normally applied by frictionally engaging said disc 8 with said wheel by the pushing force of a diaphragm spring 10, which is to be exerted upon a pressure plate 9 at the back of the disc 8, and is released when said spring 10 is moved in a direction apart from said disc 8 by a release fork 11. The transmission clutch 2 thus constructed is similar to clutches of the prior art.

The manual transmission 3 is of the two-parallel shaft type which is equipped with a transmission gear mechanism having four forward speeds and one reverse speed, for example, in a transmission case 12 (FIG 2) with the input shaft 3a, which leads to the transmission clutch 2, in parallel with an output shaft 3b which is equipped with an output gear 13 meshing with an input gear 4a of the differential gear 4. The first to fourth speed gear trains G1, G2, G3 and G4 and one reverse gear train GR are juxtaposed to one another between the two shafts 3a and 3b.

More specifically, the first to fourth speed gear trains G1, G2, G3 and G4 are respectively composed of both drive gears G1a, G2a, G3a and G4a on the input shaft 3a and driven gears G1b, G2b, G3b and G4b on the output shaft 3b, which mesh with those drive gears, respectively. A 1-2 shift first change-over clutch 14 is interposed on the output shaft 3b between the driven gears G1b and G2b of the first and second speed gear trains G1 and G2. A 3-4 shift second change-over clutch 15 is provided on shaft 3b between the driven gears G3b and G4b of the third and fourth speed gear trains G3 and G4. The individual gear trains G1, G2, G3 and G4 are selectively established by the switching operations of the switching sleeves 14a and 15a of the respective change-over clutches 14 and 15 by a shift fork (not shown). The reverse gear train GR is comprised of a drive gear GRa on the input shaft 3a, a driven gear GRb formed integrally on the switching sleeve 14a of the first change-over clutch 14, and an intermediate idle and shift gear GRc. By the switching operation of said shift gear GRc to a reverse position located at the righthand side of the drawing, as shown by the phantom lines, said drive gear GRa and said driven gear GRb are connected through said shift gear GRc thereby to establish the reverse gear train GR.

According to the present invention, the manual transmission 3 is connected in series to an auxiliary transmission 16 which has high and low transmission lines GH and GL. A hydraulic clutch 17 is incorporated into the high speed transmission line GH, and a one-way clutch 18 for allowing the overrun of the output side is incorporated into the low speed transmission line GL so that said high speed transmission line GH may be established when said hydraulic clutch 17 is applied and so that said low speed transmission line GL may be established when said hydraulic clutch 17 is released. If the manual transmission 3 is constructed of the type having two parallel shafts as has been described in the above, the auxiliary transmission 16 may be constructed in the following manner.

On either the input shaft 3a or the output shaft 3b of the manual transmission 3, e.g., here shown on the input shaft 3a, there is borne a sleeve shaft 19 which is connected to the output shaft 3b through the aforementioned transmission gear mechanism. The input shaft 3a has an extension 20 arranged to be connected to a coacting gear 21, which is fixed on said sleeve shaft 19, through the hydraulic clutch 17 and a gear 22 which is fixed on said input shaft 3a. On the axial extension of said output shaft 3b outside of said hydraulic clutch 17, there is arranged an idle gear mechanism 23 for providing connection between said coacting gear 21 and said fixed gear 22, although the idle gear mechanism 23 could be mounted on a separate shaft. The low speed transmission line GL is constructed by incorporating the one-way clutch 18 into said idle gear mechanism 23, and said high speed mechanism is constructed by enabling said sleeve shaft 19 to be connected to or disconnected from said input shaft 3a through said hydraulic clutch 17. Thus, the auxiliary transmission 16 can be advantageously assembled in a compact manner in the axially extending rear portions of the input and output shafts 3a and 3b of the manual transmission 3 by making use of the space, which is defined by the members constituting the low speed transmission line GL, as the space for arranging the hydraulic clutch 17.

Figure 2:
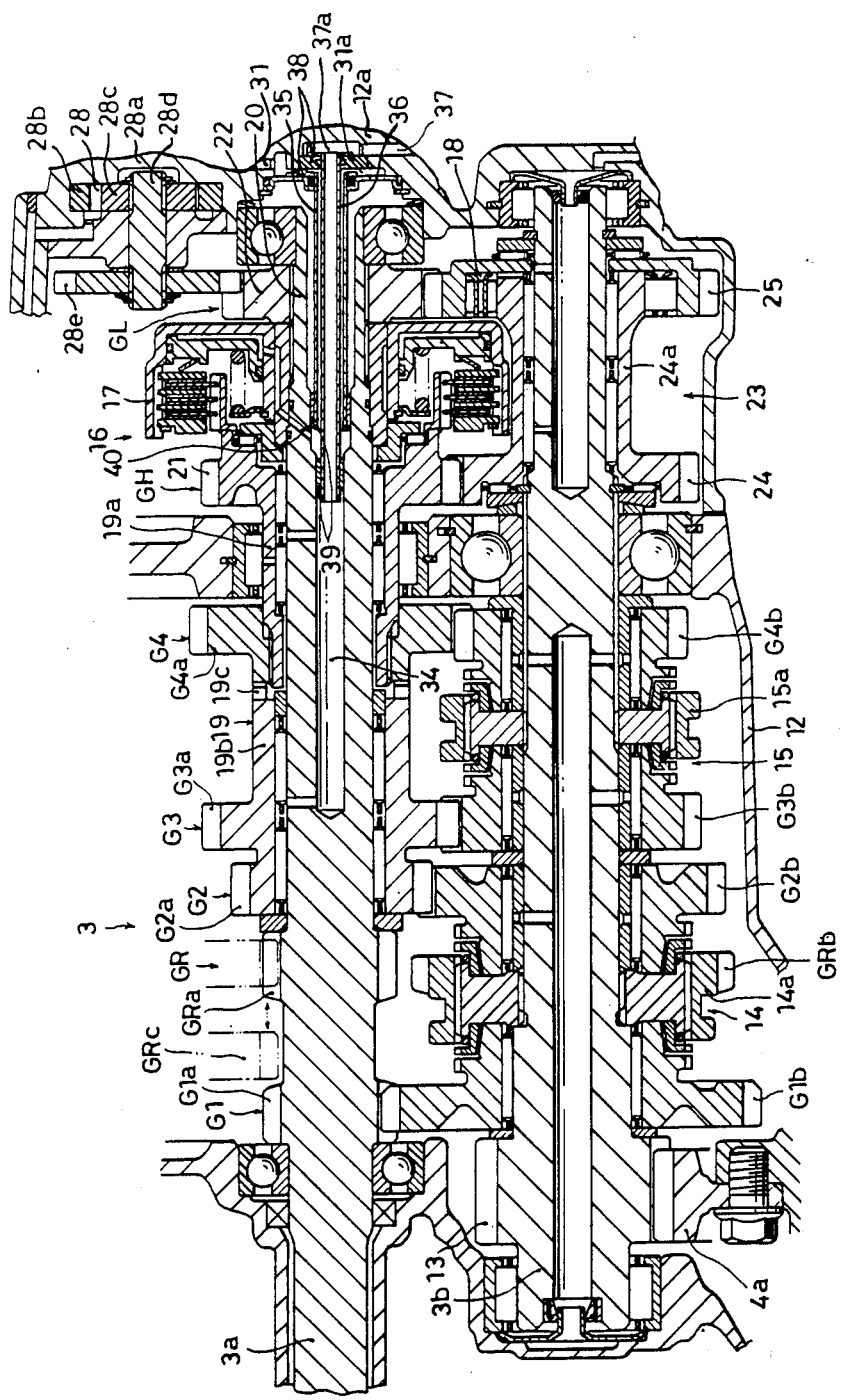
FIG. 2 is a sectional side view of the transmission of FIG. 1 and illustrating the specific construction.
Figure 3:
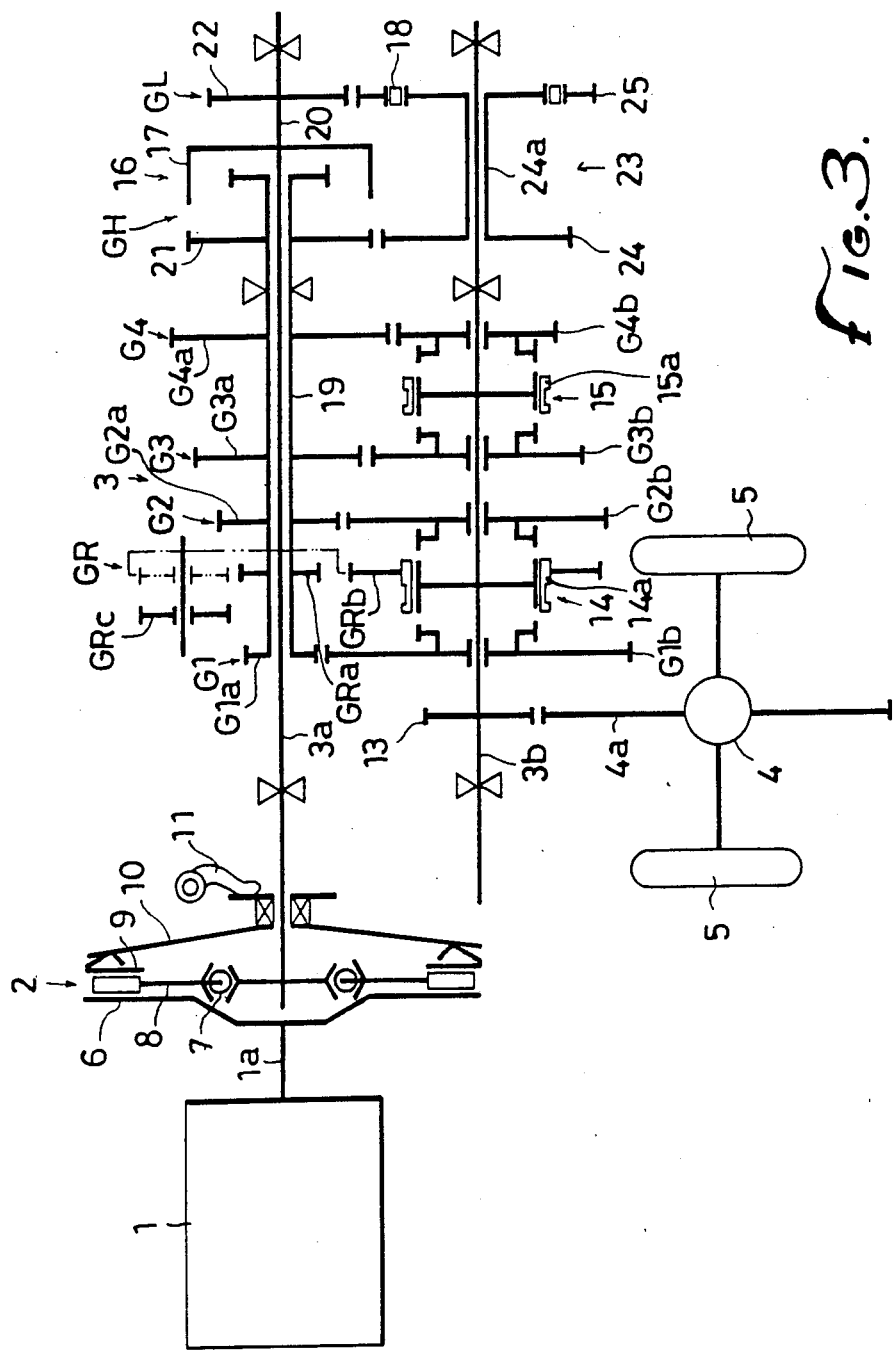
FIG. 3 is a diagramatic view of a second embodiment of the transmisson of this invention.

As shown in FIGS. 1 and 2, the sleeve shaft 19 is connected to the output shaft 3b through the second to fourth speed gear trains G2, G3 and G4 of the transmission gear mechanism of the manual transmission 3. In other words, the drive gears G1a and GRa of the first speed gear train G1 and the reverse gear train GR are directly connected to the input shaft 3a, and the drive gears G2a, G3a and G4a of the second to fourth speed gear trains G2, G3 and G4 are connected to said input shaft 3a through said sleeve shaft 19 and said auxiliary transmission 16 so that seven forward speeds and one reverse speed can be obtained as a whole. However, the present invention should not be limited to the above but can be so modified as to obtain eight forward speeds and two reverse speeds by connecting all the drive gears G1a, G2a and so on of the first to fourth speed and reverse gear trains G1, G2, G3, G4 and GR to the input shaft 3a through the sleeve shaft 19 and the auxiliary transmission 16, as shown in FIG. 3. In another modification, the sleeve shaft 19 is borne on the output shaft 3b, to which the driven gears G1b, G2b and so on are connected, and the auxiliary transmission 16 is disposed at the side of said output shaft 3b so that said sleeve shaft 19 may be connected to said output shaft 3b.

The sleeve shaft 19 of the structure shown in FIG. 2 is axially divided into rear and front halves 19a and 19b. The rear half 19a has its rear end formed integrally with the aforementioned coacting gear 21 and its front end is splined to the drive gear G4a of the fourth speed gear train G4. The front half 19b is connected to the front end of said drive gear G4a through a dog clutch 19c and the drive gears G2a and G3a of the second and third speed gears trains G2 and G3 are made integral with front half 19b.

The aforementioned idle gear mechanism 23 is equipped with a front side first idle gear 24 meshing with the aforementioned coacting gear 21 and a rear side second idle gear 25 meshing with the aforementioned fixed gear 22. The first idle gear 24 has its gear sleeve 24a borne on the axial extension of the output shaft 3b. The gear sleeve 24a is extended toward the second idle gear 25, and the aforementioned one-way clutch 18 is interposed between the gear sleeve 24a and the second idle gear 25. Thus, in normal operations, there is established the low speed transmission line GL which leads from the input shaft 3a to the sleeve shaft 19 through the line of fixed gear 22 to the second idle gear 25, then to the one-way clutch 18, then to the first idle gear 24, and then to the coacting gear 21. It should be noted that the one-way clutch 18 may be provided anywhere in this line, such as in fixed gear 22, or idle gear 24 or coacting gear 21, rather than in idle gear 25. When the aforementioned hydraulic clutch 17 is applied by the oil feed to establish the high speed transmission line GH which leads from the input shaft 3a to the sleeve shaft 19 through said hydraulic clutch 17, the power transmission through the low speed transmission line is stopped by the operation of the one-way clutch 18 allowing the overrun of the output side of said low speed transmission line GL, i.e., said first idle gear 24 in the shown structure.

Figures 4, 5:
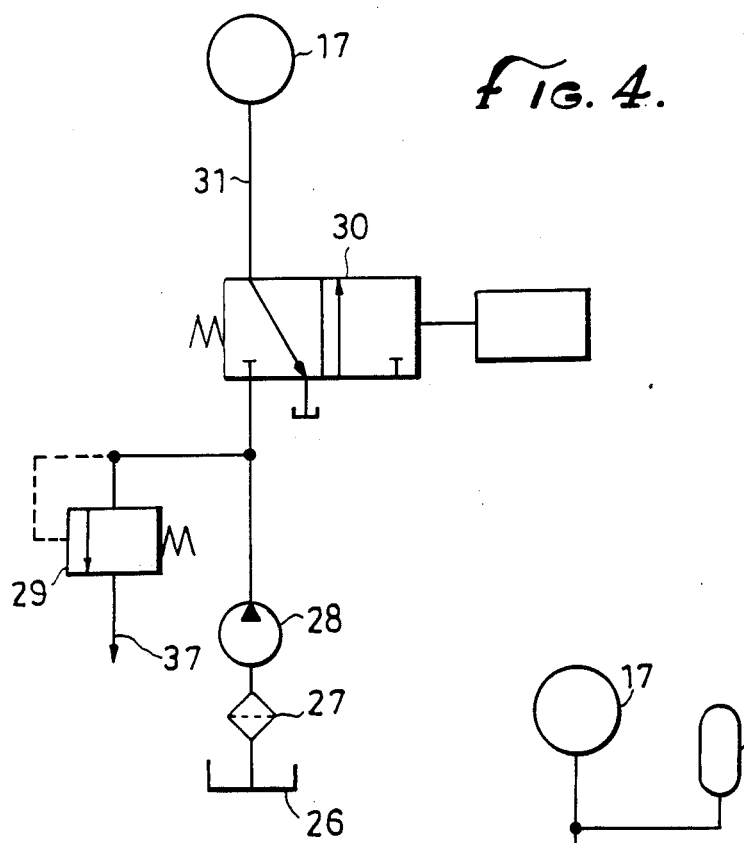
FIG. 4 is a circuit diagram of the control circuit for the hydraulic clutch in the transmission of this invention.
FIG. 5 is a circuit diagram similar to FIG. 4 illustrating a modification.

FIG. 4 shows a control circuit for the hydraulic clutch 17. The pressure oil, which is to be fed from an oil sump 26 in the transmission (FIG. 2) case 12 through a strainer 27 and an oil pump 28, is regulated to a constant pressure by the action of a regulator valve 29. The hydraulic clutch 17 is applied by feeding the oil under the regulated pressure to an oil line 31 which leads to the hydraulic clutch 17 via a changeover valve 30. If desired, an orifice 32 and an accumulator 33 may be connected with said oil line 31, as shown in FIG. 5, to dampen the abrupt fluctuations of the oil pressure when the hydraulic clutch 17 is fed with oil or the oil is released.

The changeover valve 30 is shown as a manual type in which it is shifted in mechanical or electrical cooperation with the shift lever in a vehicular compartment, but it is to be understood the valve 30 may be constructed as an automatic type in which it is automatically shifted in response to a control signal relating to the operating state of the engine 1 or the vehicle.

The connection between the hydraulic clutch 17 and the oil line 31 can be provided through a seal ring on the shaft. According to such a construction, however, the axial size and weight of the auxiliary transmission 16 are increased to an extent corresponding to the provision of the seal ring. In the structure shown in FIG. 2, therefore, the input shaft 3a is formed with a bore 34 which is opened in the axial end face of the extension 20 thereof. A pipe 35 leading to the oil line 31 is inserted from the axial end face into the bore 34 so that the hydraulic clutch 17 may be fed with or released from the oil supply via the pipe 35. Moreover, a second pipe 36 is inserted into the pipe 35 so that the portions to be lubricated, e.g., the bearing of the sleeve shaft 19 around the input shaft 3a may be fed with the oil via the second pipe 36.

More specifically, the rear end wall 12a of the transmission case 12, which faces the axial end face, is formed at its front and back with the openings from the oil line 31 and a lubricant line 37 which leads to the drain of the aforementioned regulator valve 29. The outer first pipe 35 and the inner second pipe 36 have their respective rear end portions fitted in and supported by the opening 31a of the oil line 31 and the opening 37a of the lubricant line 37, respectively, by means of supports 38. The second pipe 36 is made slightly longer than the first pipe 35, and these pipes 35 and 36 have their respective front end portions fitted hermetically in the bore 34 by means of bushings 39. A radial oil port 40 leading to the hydraulic clutch 17 is opened between the fitted portions of the two pipes 35 and 36 so that the hydraulic clutch 17 may be fed with and released from the oil supply via the first pipe 35 and the oil port 40 and so that the respective portions to be lubricated may be fed with the oil through the second pipe 36 and the bore 34 in front of the former.

The aforementioned oil pump 28 may be of any type such as an outer gearing type. In order to reduce the size, as shown in FIG. 2, the oil pump 28 is constructed of a trochoid pump of inner gearing type, in which an external gear 28b and an internal gear 28c are mounted in a pump housing 28a formed in the inner face of the rear end wall 12a of the transmission case 12. The internal gear 28c acting as the drive gear has its shaft 28d meshing through a gear 28e at its outer end with the fixed gear 22 of the aforementioned auxiliary transmission 16 so that said pump 28 may be driven in coaction with the input shaft 3a.

Figure 6:
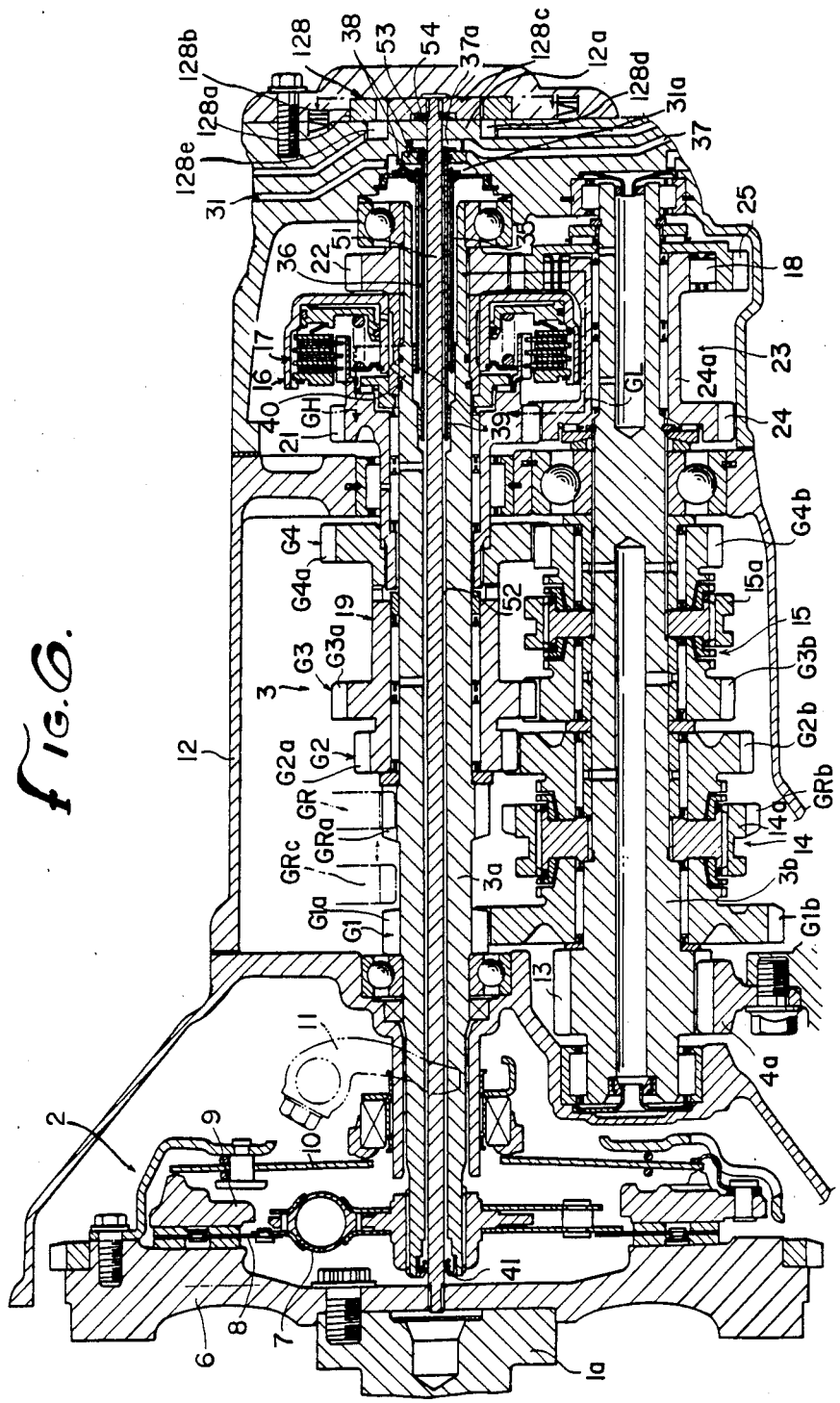
FIG. 6 is a sectional side view of the transmission, similar to FIG. 2, and illustrating a modification applicable to either of the embodiments of FIGS. 1 and 3.

Referring now to FIG. 6, a modified arrangement of the oil pump is shown and generally designated 128. The other components of the transmission are identical or substantially similar and function in the same manner, and therefore will not be redescribed but rather are identified by the same numerals. The oil pump 128 is arranged in the end wall portion 12a at the back of the transmission case 12 facing the axial end of the input shaft 3a. The input shaft 3a is constructed as a hollow shaft having a center bore 52 to accommodate a drive shaft 51 connected from pump 128 through the bore 52 to the input side member of the transmission clutch 2, e.g., the clutch wheel 6.

Figure 7:
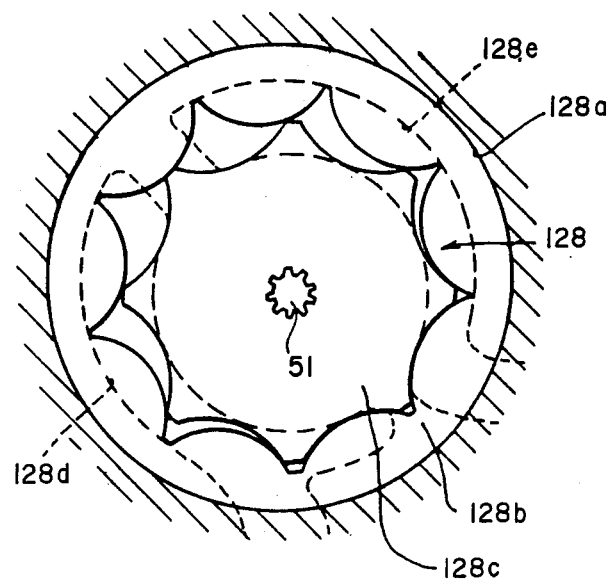
FIG. 7 is a sectional end view taken on the line VII—VII in FIG. 6.

The oil pump 128 may be of any type such as an outer gearing type. In order to reduce the size, as clearly seen from FIG. 7, the oil pump 128 is constructed of a trochoid pump of the inner gearing type, in which an external gear 128b and an internal gear 128c are mounted in a pump housing 128a formed in the outer face of the end wall portion 12a. The rear end of the drive shaft 51, which protrudes through the end wall portion 12a into the housing 128a, is splined to the internal gear 128c. The drive shaft 51 is held in position in the longitudinal direction in the housing 128a by means of a plain washer 53 and a clip 54 on said shaft 51. The front end of the drive shaft 51, forward through the bore 52, is splined to the clutch wheel 6. Thus, the power of the engine 1 is transmitted directly, i.e., not through any gear, to said drive shaft 51 so that the power transmission efficiency to the oil pump 128 is improved. Reference characters 128d and 128e appearing in the drawings indicate the suction and discharge ports of said pump 128, respectively.

In order that the piping of the shown structure between the hydraulic clutch 17 and oil line 31 may be made compact, a pipe 35 is inserted from the axial end face of the extension of the input shaft 3a into the bore 52 so that the hydraulic clutch 17 may be fed with or released from the oil supply via the pipe 35. A second pipe 36 is inserted into the pipe 35 so that the portions to be lubricated, e.g., the bearing of the sleeve shaft 19 around the input shaft 3a may be fed with the oil via the second pipe 36, similar to the arrangement previously described with respect to FIG. 2.

In this embodiment, the aforementioned drive shaft 51 is inserted into the second pipe 36, and an oil seal 41 is disposed in the inner circumference of the front end portion of the input shaft 3a so that the lubricating oil fed from the second pipe 36 is prevented from flowing out of the opening at the front end of the input shaft 3a.

With this arrangement of pump 128 in the end wall portion of the transmission case, facing the axial end face of the input shaft with its drive shaft aligned with and passing through the hollow input shaft and connected to the input side member of the transmission clutch, the power of the engine can be transmitted directly, i.e., not through any gear, to the drive shaft to drive the hydraulic pump so that the power transmission efficiency to the hydraulic pump is improved to make the power loss of the engine as a result of the drive of the oil pump smaller than that of the first described embodiment. The gear for driving the pump can be dispensed with to reduce the number of the parts. Further, the peripheral wall of the transmision case, which surrounds the auxiliary transmission arranged at the extension of the input shaft, need not bulge to correspond to the portion for accommodating the oil pump, so that the effect due to the size reduction of the auxiliary transmission can be sufficiently utilized. Moreover, the oil pump and its drive mechanism can be advantageously provided without changing the construction around the input shaft.

The overall operations of the transmission of the present invention will be explained in connection with the embodiment shown in FIGS. 1 and 2. When the high speed transmission line GH of the auxiliary transmission 16 is established while the vehicle is running at its second to fourth speeds, the drive gears G2a, G3a and G4a of the second to fourth speed gear trains G2, G3 and G4 are revolved at the same speed as the input shaft 3a so that the speed changing ratio between the input and output shafts 3a and 3b becomes equal to the gear ratio of said gear trains G2, G3 and G4, thus effecting the run at a high range. When the low speed transmission line GL is established, the drive gears G2a, G3a and G4a are revolved at reduced speeds in accordance with the reduction gear ratio of the low speed transmission line GL to the revolutions of the input shaft 3a so that the speed changing ratio between the input and output shafts 3a and 3b takes a multiplied value of the aforementioned gear ratio by the reduction gear ratio, thus causing the running at a low range.

According to the present invention, the changeover between the high and low transmission lines GH and GL of the auxiliary transmission 16 is performed by applying or releasing the hydraulic clutch 17. Even for this changeover, the transmission clutch 2 need not be released each time. When the hydraulic clutch 17 is changed from released to engaged to shift the transmission line from the low speed path GL to the high speed path GH, its engagement pressure is boosted so that the low speed transmission line GL is released by the action of the one-way clutch 18 at the instant when the r.p.m. of the sleeve shaft 19 at the output side exceeds the driving speed of the sleeve shaft 19 through the low speed transmission line GL. As a result, prior to the establishment of the high speed transmission line GH, the low speed transmission line GL is not released which thereby presents the engine 1 from racing. When the hydraulic clutch 17 is released to shift the transmission line from the high speed path GH to the low speed path GL, the low speed transmission line GL is smoothly established, at the instant when the r.p.m. of the sleeve shaft 19 drops to the drive speed of the sleeve shaft 19 by the low speed transmission line GL, so that the deceleration shocks can be avoided as much as possible.

Thus, according to the present invention, the auxiliary transmission has its high speed transmission line equipped with the hydraulic clutch and its low speed transmission line equipped with the one-way clutch for allowing the overrun of the output side so that said low speed transmission line may be established when said hydraulic clutch is released and so that, when said hydraulic clutch is applied, said low speed transmission line is released by said one-way clutch as a result of the overrun at the output side thereby to establish said high speed transmission line. The changeover between the two high and low speeds of the auxiliary transmission can be effected without operating the transmission clutch so that the operability can be improved. Moreover, the single hydraulic clutch is sufficient to reduce the cost, size and weight of the auxiliary transmission. Still moreover, the connecting and disconnecting timings for shifting the high speed transmission line and the low speed transmission line can be controlled in the most proper manner by the operations of the one-way clutch so that the shifting operations can be smoothly effected while preventing the shift shocks and the engine from being raced.

According to the invention, furthermore, one of the input and output shafts of the manual transmission of two-shaft parallel type is extended rearward to have its extension arranged with the coacting gear, the hydraulic clutch and the fixed gear, whereas the other shaft has its axial extension arranged with the idle gear mechanism into which the one-way clutch for providing the connection between said coacting gear and said fixed gear is incorporated. The hydraulic clutch is accommodated in the space surrounded by the idle gear mechanism so that the auxiliary transmission can be assembled compactly in the rear portions of the input and output shafts of the manual transmission thereby to further reduce the size of the transmission.

The invention claimed is:

1. A vehicular transmission of the type in which a manual transmission of the type having two parallel shafts has one shaft connected through a transmission clutch to an engine and in which said manual transmission is connected in series to an auxiliary transmission having high and low speed transmission lines, comprising said auxiliary transmission having a high speed transmission line equipped with a hydraulic clutch and a low speed transmission line equipped with a one-way clutch for allowing the overrun of the output side of said low speed transmission line so that said low speed transmission line is established when said hydraulic clutch is released and said high speed transmission is established when said hydraulic clutch is applied, a sleeve shaft on one of the two said shafts of said manual transmission, a transmission gear mechanism connecting said sleeve shaft to the other shaft, said one shaft having an extension with a fixed gear thereon, a coacting gear fixed on said sleeve shaft, said hydraulic clutch and coacting gear positioned on said extension of said one shaft, an idle gear mechanism in meshing engagement with both said coacting gear and said fixed gear, said idle gear mechanism having said low speed transmission line one-way clutch, and said hydraulic clutch operable to connect and disconnect said sleeve shaft to and from said one shaft.

2. A vehicular transmission as set forth in claim 1, wherein said one shaft is formed with a bore opened in the axial end face of said extension; and a pipe is inserted into said bore from said axial end face so that said hydraulic clutch may be fed with or released from an oil supply via said pipe for operating said hydraulic clutch.

3. A vehicular transmission as set forth in claim 2, wherein, said pipe is composed of inner and outer pipes so that both the oil feed and release of said hydraulic clutch and the feed of oil to the necessary portions around said one shaft may be effected through said outer and inner pipes.

4. A vehicular ransmission as set forth in claim 1, wherein said one shaft is hollow, a hydraulic pump for operating said hydraulic clutch is positioned in axial alignment with the end of said one shaft opposite the end connected to the transmission clutch, and a shaft positioned in said hollow of said one shaft and connected to both said hydraulic pump and through said transmission clutch to said engine for driving said pump.

5. A vehicular transmission as set forth in claim 4, wherein, said idle gear mechanism includes a pair of gears mounted on said other shaft with said one-way clutch operably connecting said pair of gears.

6. A vehicular transmission as set forth in claim 1, wherein said idle gear mechanism includes a pair of gears mounted on said other shaft with one of said pair meshing with said coacting gear and the other meshing with said fixed gear, and said one-way clutch is operably positioned in the the drive train through those four gears.

7. A vehicular transmission as set forth in claim 1, wherein said manual transmission has at least one gear speed connection directly between said two parallel shafts and not connected through the sleeve shaft and said auxiliary transmission.

8. A vehicular transmisssion as set forth in claim 7, wherein said at least one gear speed includes both the lowest speed and reverse speed.

* * * * *